United States Patent [19]

Bazaj et al.

[11] Patent Number: 4,745,761
[45] Date of Patent: May 24, 1988

[54] VIBRATION DAMPED CRYOGENIC APPARATUS

[75] Inventors: Dipak K. Bazaj, Tucson, Ariz.; David L. Swartz, Westerville, Ohio

[73] Assignee: Research & Manufacturing Co., Inc., Tucson, Ariz.

[21] Appl. No.: 792,905

[22] Filed: Oct. 30, 1985

[51] Int. Cl.⁴ .............................................. B01D 8/00
[52] U.S. Cl. ..................................... 62/55.5; 62/100; 62/268; 62/295; 248/638; 417/363
[58] Field of Search ............... 62/100, 268, 55.5, 295; 248/636, 638; 417/363

[56] References Cited

U.S. PATENT DOCUMENTS

| | | | |
|---|---|---|---|
| 3,894,403 | 7/1975 | Longsworth | 62/514 R |
| 4,363,217 | 12/1982 | Venuti | 62/295 |
| 4,489,991 | 12/1984 | Delam | 248/638 |
| 4,539,822 | 9/1985 | Sundquist | 62/55.5 |

Primary Examiner—Ronald C. Capossela
Attorney, Agent, or Firm—Porter, Wright, Morris & Arthur

[57] ABSTRACT

A vibration isolated cryogenic apparatus mounted as a mass in a series of mass/elastomer/mass springed system.

2 Claims, 2 Drawing Sheets

VIBRATION DAMPED CRYOGENIC APPARATUS

FIELD OF THE INVENTION

This invention relates to vibration damping means useful in cryogenic applications, particularly applications in which a cryopump is used to provide a vacuum source that is necessary for the operation of sensitive measurement, detection and fabrication systems.

BACKGROUND OF THE PRIOR ART

Cryogenic vacuum pumps having a vibration damping means have found many industrial uses in applications that require a non-contaminating and noise free environment, such as electron microscopy, gamma ray sensing, electron beam and x-ray, lithography, certain types of spectroscopy and other measurement and detection applications where a vibration free environment is necessary. Generally in such applications, it is an object to provide a vacuum produced by cryogenic refrigeration that is mechanically isolated from the sensitive detection or other instrumentation means.

Among disclosures in the prior art of damping means to produce a vibration free environment for a cryopump are means described in U.S. Pat. No. 3,894,403, "Vibration Free Refrigeration Transfer", issued on July 15, 1975 and in U.S. Pat. No. 4,363,217 "Vibration Damping Apparatus" issued on Dec. 14, 1962. Air Products and Chemicals, Inc., Allentown, Pa. 18105 also manufactures a line of commerically available cryopumps useful in applications that must be free of pump induced vibration.

OBJECT OF THIS INVENTION

It is an object of this invention to provide a vibration free cryogenic cooling means for a sensitive detector apparatus. In this regard it is further an object to provide an engine vibration sink for a cryopump which serves as the cooling medium for a sensitive detector, such as a gamma ray detector. It is an object to provide a springed, polymeric, elastomer or similar elastic material as a vibration absorber in conjunction with a cryopump that serves as the cooling source for a detection means. In this manner, different degrees of vibration damping may be achieved and the degree of damping itself may be controlled by selecting appropriate spring and/or damping constants or one or more springs or one or more layers of elastomer in one or multiple degrees of freedom configuratins used in the vibration sink assembly.

These and other objects of the invention are explained more readily taken in conjunction with the drawings attached.

DESCRIPTION OF THE PREFERRED EMBODIMENT

Figure 1:
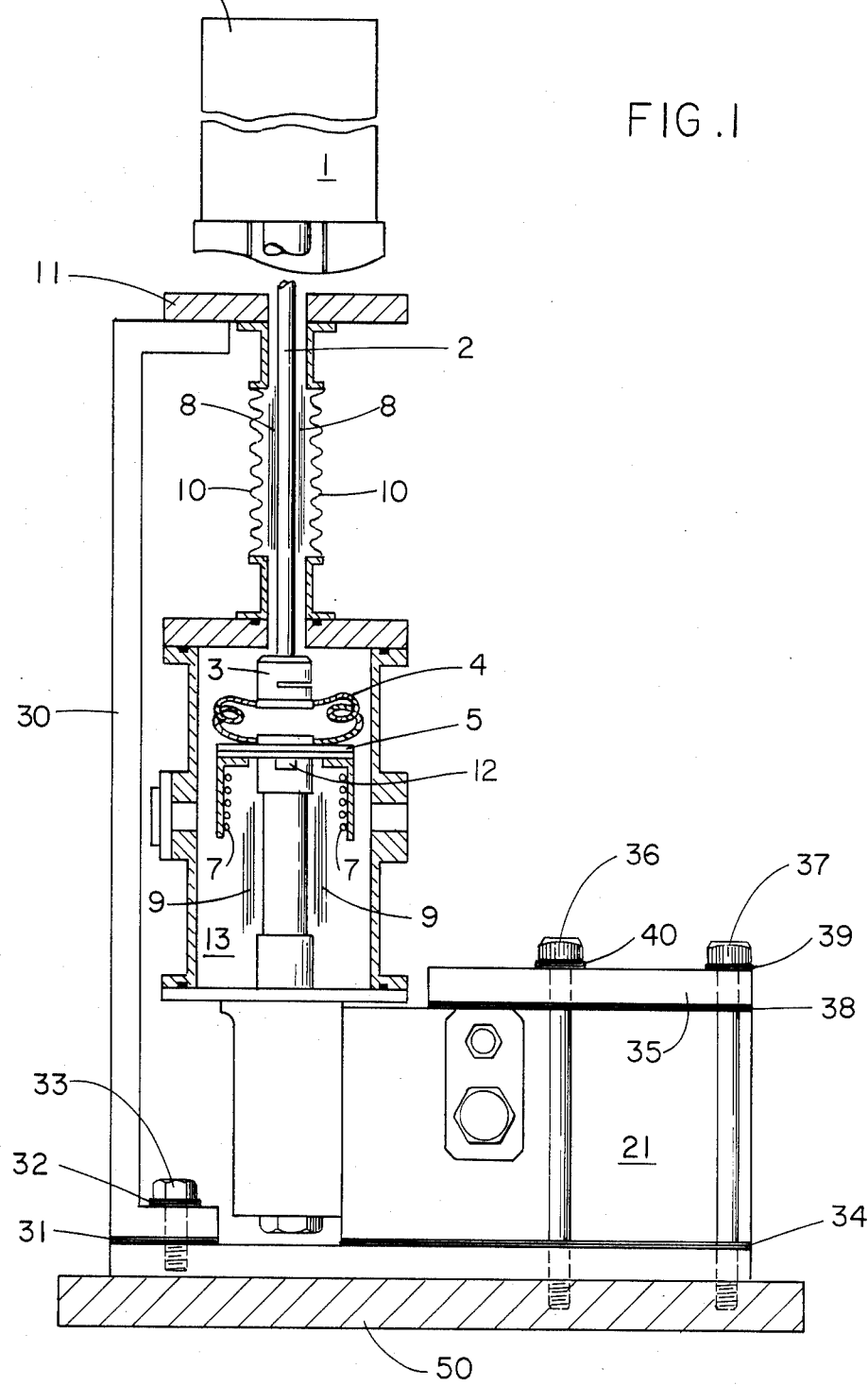
FIG. 1 is a vertical cross-section of a cryogenic cooling system, having a vibration sink, and useful with a detector such as a gamma ray detector.

In FIG. 1, there is shown as an example a gamma ray detector cooler in a cross-sectional vertical view. The detector is shown at 1, having a thermal extension 2, intrinsically converted to thermal extension receptacle 3, which in turn is connected through a thermal link, or heatwick, such as a conventionally used annealled copper braid or wire rope 4, to the source of cryogenic refrigeration 5 such as a connection to the cold plate 5 of a cryogenic refrigerator, such as a single stage refrigerator 21 having a configuration well known to those in the art. In the connecting configuration a removable absorbent may be provided and insulation is applied in layers to appropriate areas 8 and 9. A vacuum vibration isolation bellows assembly is similarly provided at 10 enclosing the insulated detector thermal extension. A suitable interface for mechanical connection of the detector to the cooling assembly is shown at 11. A cryogenic thermometer is shown at 12 and one or more electrical feed thrus are provided at 13 for detector and instrumentation interface. A typical top view of the apparatus of FIG. 1 would show a circular cross-sectional configuration having a concentric alignment of the various members of the apparatus.

A supporting connection which securely maintains the detector in secure attachment to a common base 50, with the refrigerator engine is shown at 30, comprising a rod or beam support which may be a unitary metal element, a formed frame or an assembly of separate pieces. Vibration damping means is, however, applied to isolate the beam 30 from the fixed base 50. Such means comprises an elastomeric mat, matting or pad 31 at the interface of the beam and base. A second interface is between the head of the bolt 33, or other attachment means used to secure the beam to the common base such as the elastomer pad shown at 32. The elastomer and mass counteract one another to provide a motionless support.

The attachment of the refrigerator engine to the common base is similarly accomplished. At the interface between the base 50 and the engine 21 a rubber mat or pad 34 is supplied between the oppositely facing surfaces of the respective members. Similarly a further vibration sink 35 comprising a mass such as a 0.5 inch steel plate is applied to the opposite side of the engine and is in turn secured by bolts 36 and 37 to the base plate. The resilient elastomer mat at the interface of the engine side surface and the vibration sink 35 is shown at 38; further elastomeric matting between the bolt heads and vibration sink is shown at 39 and 40. In the depiction of FIG. 1, it can thus be seen that the refrigerator engine is isolated as if in a manner that it is suspended between oppositely mounted springs in a manner in which vibration will be damped. The arrangement is analogue to the physical connection in a multiple degree of freedom damped mass spring system such as a series connection of mass/spring/mass/spring/mass. When the masses and springs are appropriately tuned in such an arrangement, the vibrations are transmitted thru the springs and the damping masses where each essentially counteracts the other to produce an essentially apparently motionless mass. In FIG. 1, the relationship of base 50, pad 34, pad 31, engine 21, pad 38 and damping mass 35 produces such a result on comparably mounted beam 30. The mounting means such as the bolts 36 and 37 and their respective pads 39 and 40 are essentially transparent to the springed mass vibration damping arrangement. In a similar manner, vibrations affecting the support beam for the detector are also damped.

Figure 2:
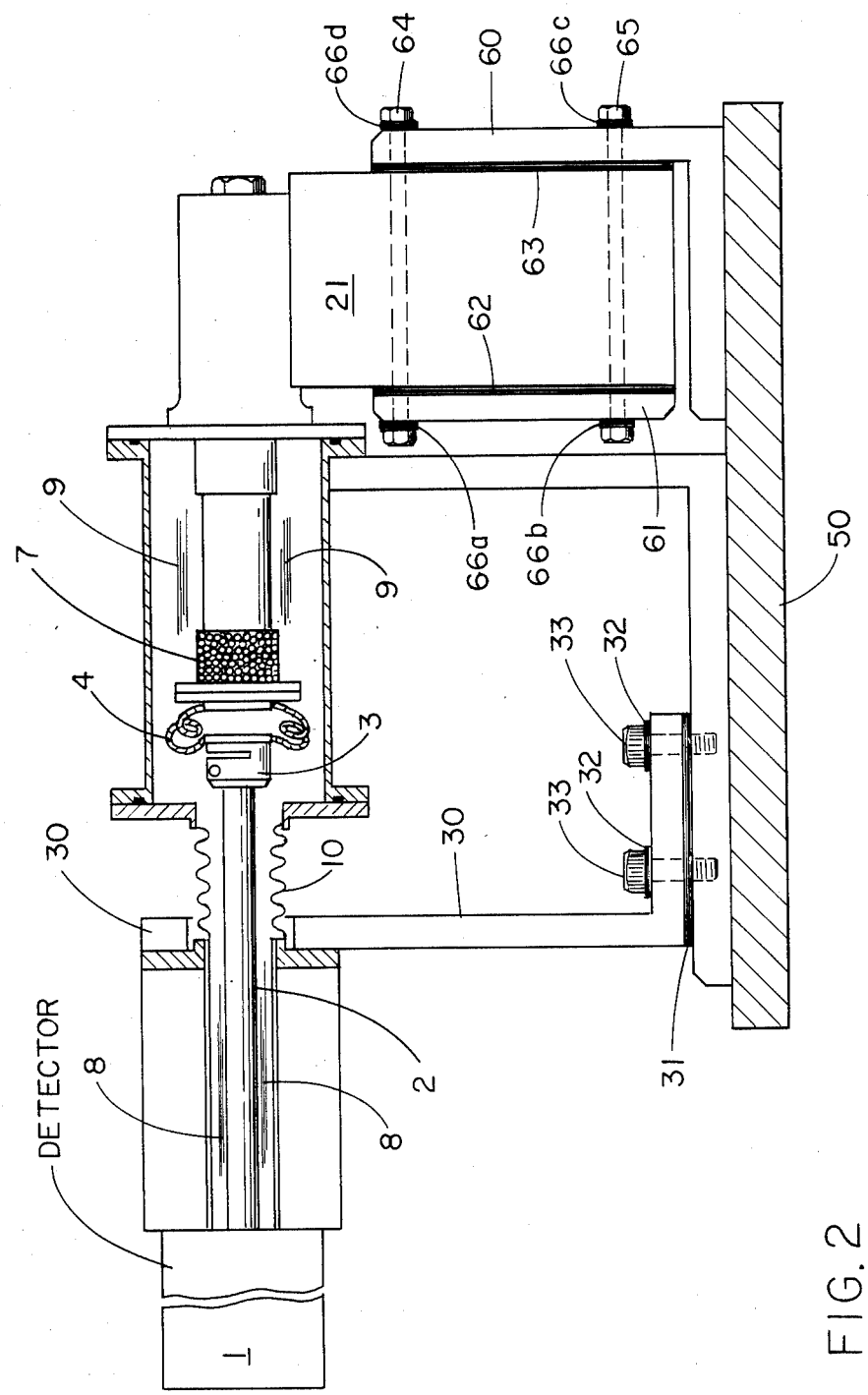
FIG. 2 is a side cross-sectional view of a similar apparatus in a horizontal orientation.

FIG. 2 shows a comparable horizontal arrangement in which the elements of the concentrically alligned detector means are identified by the same numerals used for comparable elements in FIG. 1. The refrigerator engine 21 and common base 50 are similarly identified. Rigid support means for the engine is provided at 60 having oppositely disposed vibration sink or mass 61 maintained in the vibration damping alignment thru elastomer pads 62 and 63, applied at the interface of facing surfaces and secured together thru bolts 64 and 65 which are similarly padded or insulated from surface contact with the engine or sink by damping pads shown as 66a, b, c and d. It is noted that in the use of the bolts the sides of the bolts are preferred to be physically isolated from contact with the spring and mass means; thus additional padding may be provided. Also depending upon the system configuration and source or type of vibration, more than one vibration sink of the type described herein may be used. Thus a consecutive series of mass/elastomer/mass, etc., may be utilized in a layered relationship. Similarly, different masses may be used in such configurations.

What is claimed is:

1. A method of inhibiting the transmission of vibration from a cryogenic refrigerator to an adjacent cryogenic detector apparatus to which the refrigerator is operatively interconnected, comprising:

mounting one side of the cryogenic refrigerator to a base plate and mounting said cryogenic detector apparatus to the same base plate through a beam support extending from the base plate to the detector;

providing in the mounting of the refrigerator a first layer of an elastomeric interface between the refrigerator and the base plate; and providing in the mounting of the cryogenic detector, a second layer of an elastomeric interface between the beam support for the detector apparatus and the mounting of the beam support extending from the base plate;

providing a damping mass adjacent a side of the refrigerator opposite the one side mounted to the base plate and providing in the mounting of said damping mass to the opposite side of the refrigerator a further layer of an elastomeric interface between the opposite side of the refrigerator and the damping mass;

whereby the refrigerator and the detector are mounted as masses in a mass/elastomeric/mass elastomeric/mass series springed system to produce an essentially apparently motionless relationship between the refrigerator and the detector.

2. The method of claim 1 including the supperssion of the transmission of vibration from the refrigerator to the detector at the point of their operative interconnection by providing a heat wick connection between the refrigerator and the detector.

* * * * *